United States Patent
Bronicki et al.

[11] Patent Number: 5,809,782
[45] Date of Patent: Sep. 22, 1998

[54] METHOD AND APPARATUS FOR PRODUCING POWER FROM GEOTHERMAL FLUID

[75] Inventors: Lucien Y. Bronicki, Yavne; Naday Amir, Rehovot; Uri Kaplan, Doar Na Emek Soreq, all of Israel

[73] Assignee: Ormat Industries Ltd., Israel

[21] Appl. No.: 815,660

[22] Filed: Mar. 10, 1997

Related U.S. Application Data

[63] Continuation of Ser. No. 443,424, May 18, 1995, abandoned, which is a continuation-in-part of Ser. No. 365,845, Dec. 29, 1994, abandoned.

[51] Int. Cl.⁶ ............................................. F03G 7/04
[52] U.S. Cl. .................................. 60/641.2; 60/655
[58] Field of Search ........................... 60/641.2, 641.5, 60/646, 651, 655, 656, 677

[56] References Cited

U.S. PATENT DOCUMENTS

| | | | |
|---|---|---|---|
| 4,542,625 | 9/1985 | Bronicki | 60/641.2 |
| 4,703,722 | 11/1987 | Fukayama | 60/646 |
| 4,744,723 | 5/1988 | Hashimoto et al. | 60/646 |
| 4,967,559 | 11/1990 | Johnston . | |
| 4,996,846 | 3/1991 | Bronicki . | |
| 5,038,567 | 8/1991 | Moritz | 60/671 |
| 5,119,635 | 6/1992 | Harel | 60/641.2 |
| 5,526,646 | 6/1996 | Bronicki et al. | 60/641.2 |
| 5,531,073 | 7/1996 | Bronicki et al. | 60/641.2 |

FOREIGN PATENT DOCUMENTS

| | | |
|---|---|---|
| 0 372 864 | 6/1990 | European Pat. Off. . |
| 2162584 | 5/1986 | United Kingdom . |

*Primary Examiner*—Noah P. Kamen
*Attorney, Agent, or Firm*—Donald M. Sandler

[57] ABSTRACT

A modular power plant operating from a source of geothermal fluid that produces geothermal steam containing non-condensable gases such as hydrogen sulfide, and geothermal brine, includes a steam module and an organic fluid module. The steam module has a steam turbine coupled to a generator for expanding the geothermal steam and producing electrical power, low pressure steam, and condensed steam. The organic fluid module includes a vaporizer containing an organic fluid and receiving low pressure steam slightly above atmospheric pressure from the steam module for producing vaporized organic fluid, steam condensate, and a mixture of steam and non-condensable gases, an organic vapor turbine coupled to a generator for expanding the vaporized organic fluid and producing electrical power and expanded organic fluid, a condenser for condensing the expanded organic fluid to liquid organic fluid, preheater apparatus for preheating the liquid organic fluid using heat contained in the steam condensate and producing cooled steam condensate, and a pump for supplying preheated organic fluid to the vaporizer.

36 Claims, 3 Drawing Sheets

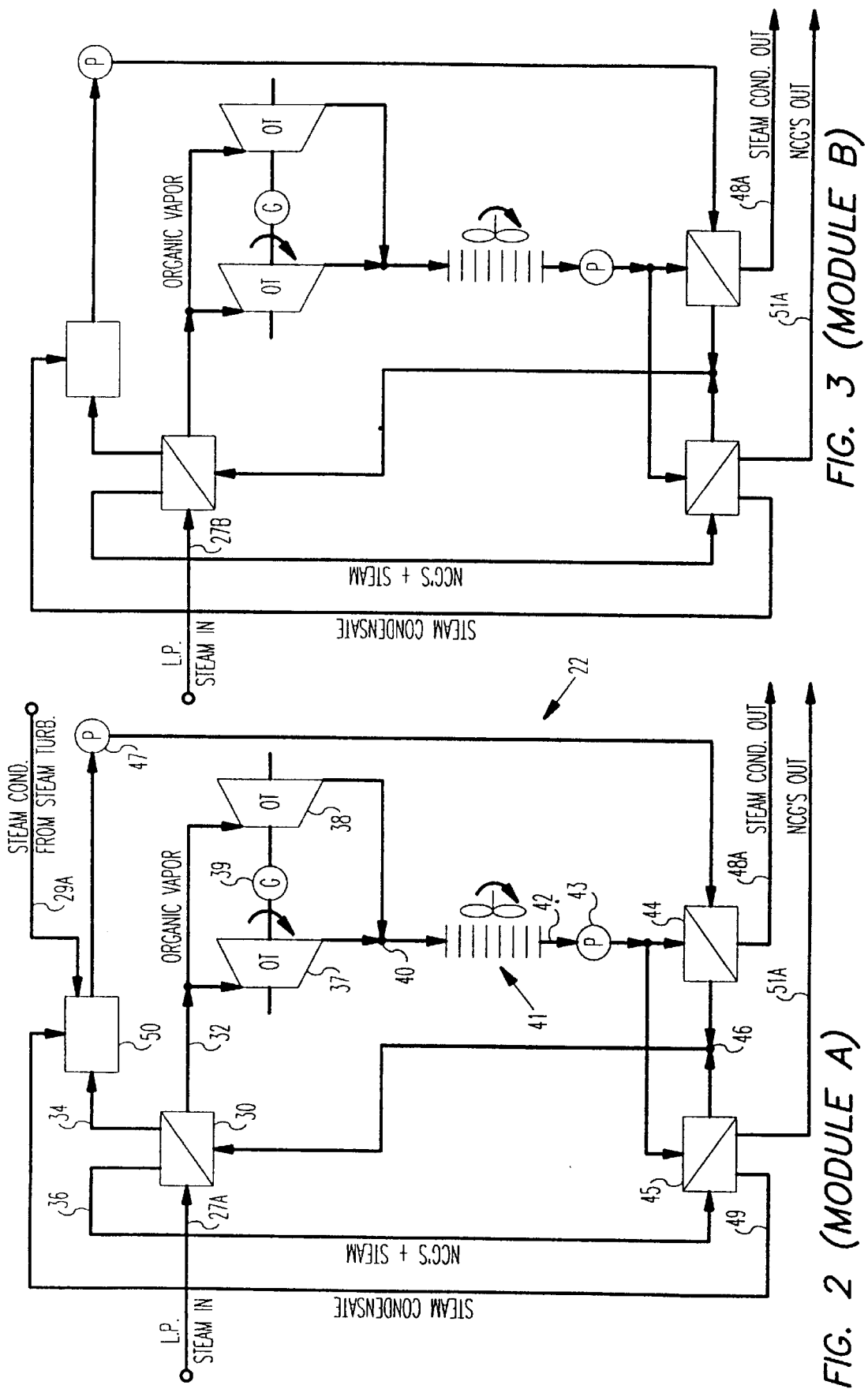

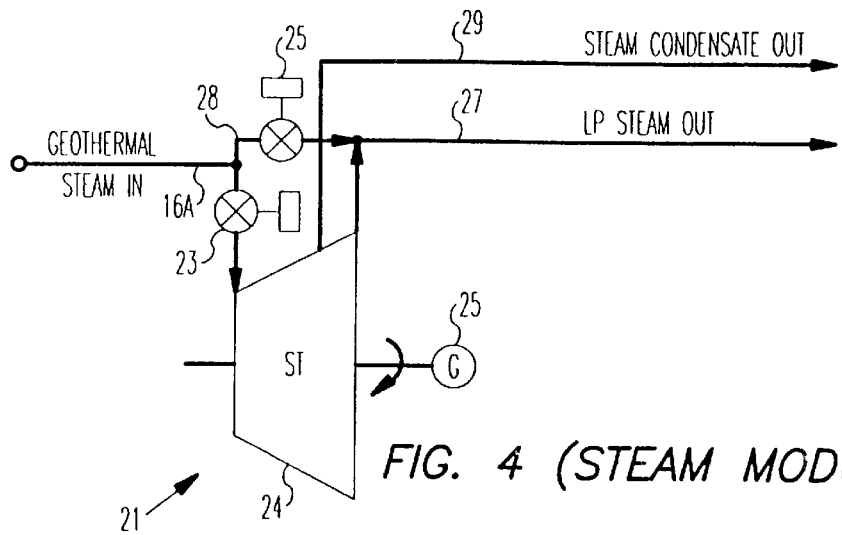
FIG. 4 (STEAM MODULE)
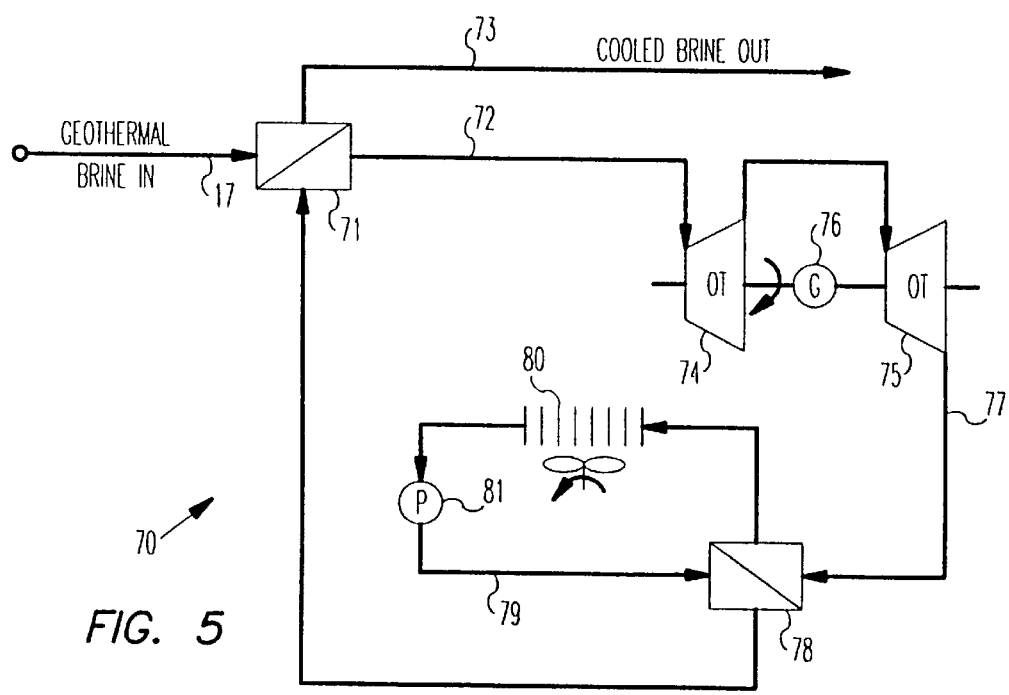
FIG. 5
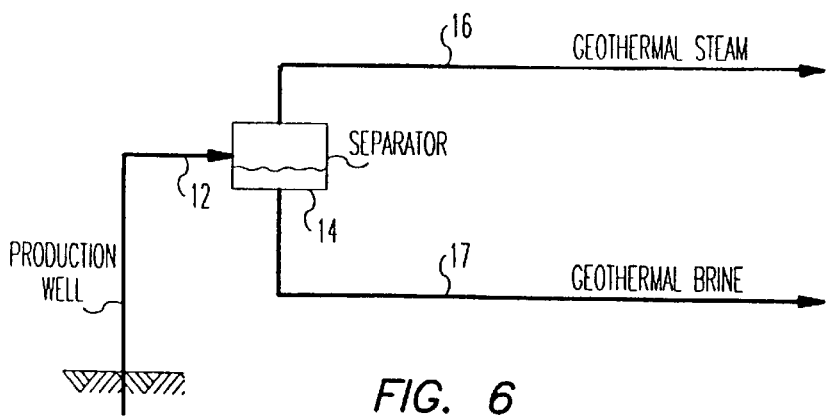
FIG. 6

METHOD AND APPARATUS FOR PRODUCING POWER FROM GEOTHERMAL FLUID

This application is a continuation of application Ser. No. 08/443,424, filed May 18, 1995, now abandoned, which is a CIP of Ser. No. 08/365,845, filed Dec. 29, 1994, now abandoned.

TECHNICAL FIELD

This invention relates to a method of and apparatus for producing power from geothermal fluid.

BACKGROUND OF THE INVENTION

Recent global surveys of natural resources have revealed geothermal fields capable of producing large sustained flows of geothermal fluid having a high ratio of steam to brine and significant amounts of non-condensable gases (NCG's) with a relatively high concentration of hydrogen sulfide. In harnessing these fields for power production, the fluid is separated into steam and brine channels, and the steam used to drive turbines coupled to generators. When the temperature of the steam after separation from the fluid is in excess of about 160° C., the steam is considered to be high pressure geothermal steam; and the fields producing such steam have the potential for large scale power production.

Unfortunately, sufficient local water to cool the condensers of the turbines is often lacking in many fields requiring the use of cooling towers which release NCG's into the atmosphere unless these gases are drawn off the condensers and re-injected into the ground together with the steam condensate and brine which constitute spent geothermal fluid. The maintenance associated with cooling towers and the power consumption involved in pressurizing the NCG's for re-injection all militates against this approach to power generation.

Air cooled condensers are theoretically possible, but their cost and size, and the consequential unavailability of a significant amount of power by reason of the large amount of heat remaining in the condensate, have not made this approach practical. Another approach to this problem has been to utilize a combined cycle in which the steam exhausted from the steam turbines is condensed by vaporizing an organic fluid, such as pentane, that is the working fluid for a Rankine cycle power plant module associated with the steam turbine. Air or water cooled condensers may be used in the organic Rankine cycle portion of the plant; but the power consumption involved in disposal of the NCG's by pressurization and re-injection reduces the net power produced by the installation.

It is therefore an object of the present invention to provide a new and improved method of and apparatus for producing power from geothermal fluid and substantially preventing the release of non-condensable gases, often containing relatively large quantities of hydrogen sulfide, into the atmosphere which substantially overcomes or significantly reduces the disadvantages outlined above.

BRIEF DESCRIPTION OF THE INVENTION

The present invention provides a modular power plant operating from a source of geothermal fluid that produces geothermal steam containing non-condensable gases such as hydrogen sulfide, and geothermal brine. According to the present invention, the power plant comprises at least one steam module having a steam turbine coupled to a generator for expanding the geothermal steam and producing electrical power, low pressure steam, and condensed steam. At least one organic fluid module is also provided. This module includes a vaporizer containing an organic fluid and receiving low pressure steam from the steam module for producing vaporized organic fluid, steam condensate, and a mixture of steam and non-condensable gases, at least one organic vapor turbine coupled to a generator for expanding the vaporized organic fluid and producing electrical power and expanded organic fluid, a condenser for condensing the expanded organic fluid to liquid organic fluid, preheater apparatus for preheating the liquid organic fluid using heat contained in the steam condensate and producing cooled steam condensate, and a pump for supplying preheated organic fluid to the vaporizer. Disposal apparatus is also provided for disposing of the cooled non-condensable gases without releasing significant concentrations of hydrogen sulfide into the atmosphere.

In accordance with the present invention, the organic fluid vaporizers included in the modules preferably operate at conditions slightly above atmospheric pressure on the steam side of the vaporizers so that the extraction of the non-condensable gases and steam drawn off and supplied to the disposal apparatus is also carried out at pressures slightly above atmospheric pressure. Thus, the present invention is energetically efficient because minimal compressor power is needed.

Preferably, the disposal apparatus includes a cooler for cooling the mixture of steam and NCG's producing condensate and cooled non-condensable gases, and a chemical abatement plant for chemically treating the cooled non-condensable gases to remove sulfur therein and producing essentially sulfur-free gases, or gases without a significant amount of hydrogen sulfide or sulfur, that are vented to the atmosphere.

Alternatively, a relatively high stack can be built for permitting the non-condensable gases to be released at a relatively high altitude. Such release ensures that the concentration of sulfur compounds at substantially ground level is in accordance with environmentally allowed concentration levels.

Preferably, the preheater apparatus of the organic fluid module also includes a heat exchanger for preheating the liquid organic fluid using heat contained in the mixture of steam and non-condensable gases. The heat exchanger separates steam condensate from the mixture which is added to the steam condensate produced by the vaporizer of the organic fluid module.

BRIEF DESCRIPTION OF THE DRAWINGS

An embodiment of the present invention is described by way of the example with reference to the accompanying drawing wherein:

FIG. 2 is a block diagram of type A organic fluid modules;

FIG. 3 is a block diagram of type B organic fluid modules;

FIG. 4 is a block diagram of a steam module;

FIG. 5 is a block diagram of a brine module that is part of the power plant;

FIG. 6 is a schematic representation of a production well in a geothermal field and of a separator for separating geothermal fluid into a geothermal steam and a geothermal brine channel.

DETAILED DESCRIPTION

Figure 1:
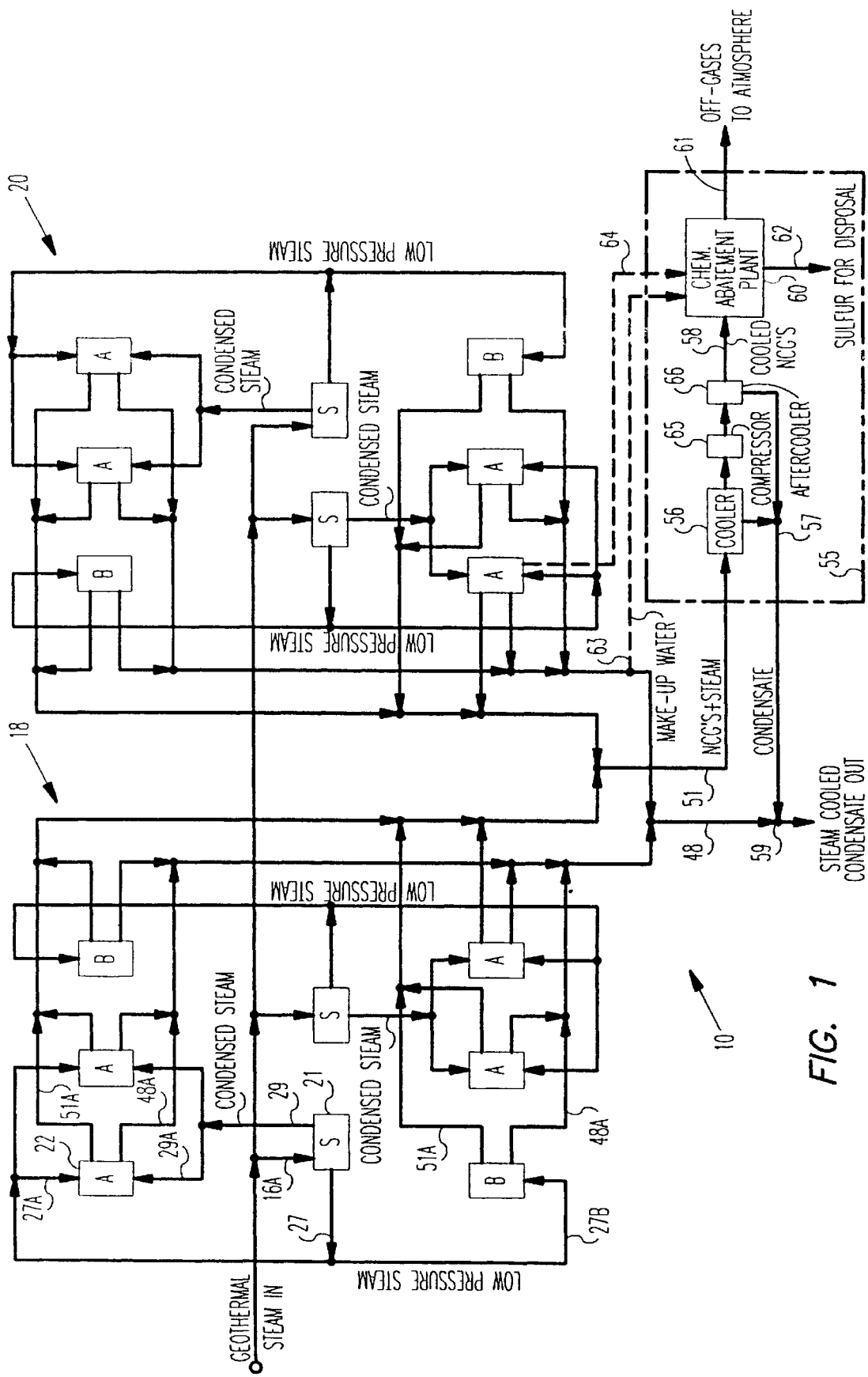
FIG. 1 is a block diagram which represents, in a schematic way, a power plant in accordance with the present invention having steam modules S and organic fluid modules A and B.

Referring now to FIG. 1, reference numeral 10 designates a modular power plant for producing power from geothermal steam containing non-condensable gases extracted from a production well in a geothermal fluid resource shown schematically in FIG. 6. As shown in FIG. 6, geothermal fluid is extracted from the ground via production well 12 and piped to separator 14 which separates the geothermal fluid into geothermal steam that exits the separator at 16, and into geothermal brine that exits at 17.

When the geothermal steam at 16 has a temperature of about 160° C. or more, the geothermal steam is said to be of a high pressure. Such steam often contains large quantities of non-condensable gases having, in most cases, a hydrogen sulfide component, whose release into the atmosphere must be strictly controlled for environmental reasons.

According to the present invention, modular power plant 10 utilizes both the geothermal steam and brine for power production. When plant 10 is designed for a large-scale geothermal power project, such as 120 MW, two main modules 18 and 20 may be provided. Of course, the number of main modules will depend on the mass flow of available geothermal steam in line 16.

Each main module includes at least one steam module 21, and preferably four steam modules which are identical and produce about 20 MW each, and at least one organic fluid module 22, and preferably three organic fluid modules for each steam module, each organic fluid module producing about 3.5 MW. The steam modules are configured as shown in FIG. 4, and supplied in parallel with geothermal steam via line 16. The organic fluid modules are configured as shown in FIGS. 2 and 3.

As shown in FIG. 4, each steam module includes steam turbine 24 coupled to generator 25. Geothermal steam is supplied to module 21 by line 16A connected to line 16. Selectively operable bypass valve 26 and inlet valve 23 of a valve system control the admission of steam to the turbine. When steam is admitted to turbine 24 by suitably setting inlet valve 23 and by-pass valve 26, the geothermal steam expands in the turbine driving generator 25 producing electrical power. The expanded steam, low pressure steam exhausts from the turbine through exhaust line 27 and is supplied to one or more organic fluid modules.

Steam module 21 is also provided with by-pass line 28 which connects line 16A directly to exhaust line 27 via bypass valve 26 which is designed to permit about 75% of the flow through the turbine, and to permit the remainder of the flow to by-pass the turbine and pass directly into exhaust line 27. Under this condition, the pressure of the geothermal steam reaching the exhaust line is reduced to substantially the level of the exhaust steam when the turbine is operating. By-pass line 28, inlet valve 23, and by-pass valve 26 are particularly advantageous during start-up operations permitting the steam turbine to quickly reach its stable operating condition as it quickly accelerates to its synchronization speed. As steam turbine 24 reaches its synchronization speed, by-pass valve 26 is closed and inlet valve 23 is fully opened.

Inherent in the operation of steam turbine units is the production of steam condensate within the casing (not shown) of the steam turbine. A relatively significant amount of steam condensate is produced; and instead of wasting the heat contained in this condensate, the steam condensate is collected in line 29 and delivered to one or more of the organic fluid modules as described below.

Organic fluid module 22 (FIG. 2) receives low pressure steam from steam module 21 via line 27A which is an extension of line 27 of the steam module. Module 22 includes vaporizer 30 which contains an organic fluid that is vaporized by the condensation of the low pressure steam. Vaporizer 30 produces vaporized organic fluid in line 32, and steam condensate in line 34. A mixture of steam and non-condensable gases is drawn off into line 36 preferably at the top of the steam side of the vaporizer.

Module 22 also includes at least one organic vapor turbine coupled to a generator. Expansion of the vaporized organic fluid in the organic turbine produces expanded organic fluid and drives the generator which produces electrical power that supplements the power produced by generator 25 of the steam module. Preferably, module 22 includes two organic vapor turbines 37, 38 coupled to a single generator 39 interposed between the two organic vapor turbines. Turbines 37, 38 receive vaporized organic fluid for line 32 in parallel. Each of the organic turbines produce expanded organic fluid in exhaust line 40 connected to condenser 41, preferably air-cooled, wherein the expanded organic fluid is condensed to liquid organic fluid in line 42. Cycle pump 43 returns the liquid organic fluid to vaporizer 30 by way of preheater apparatus which preheats the liquid organic fluid.

Preferably, the preheater apparatus includes heat exchangers 44 and 45 which receive liquid organic fluid from pump 43 in parallel and deliver preheated liquid to node 46 connected to the organic side of vaporizer 30. Heat exchanger 44 receives steam condensate from vaporizer line 34 via pump 47, the steam condensate giving up sensible heat to the liquid organic fluid entering the heat exchanger due to the operation of pump 43, and forming cooled steam condensate that exits in line 48A.

Heat exchanger 45 receives the mixture of steam and non-condensable gases from the steam side of the vaporizer via line 36. The steam condenses in this heat exchanger; and non-condensable gases together with a small amount of steam, are drawn off from heat exchanger 45 at 51A. The condensing steam gives up its latent heat to the organic liquid; and the resultant steam condensate is piped via line 49 to tank 50 connected to line 34. Steam condensate produced by heat exchanger 45 is combined in tank 50 with with steam condensate produced by vaporizer 30, and the combined condensate is applied by pump 47 to heat exchanger 44.

As shown in FIG. 1, module 22 also receives, via line 29A connected to line 29 of the steam module, steam condensate from steam module 21 produced in the casing of the steam turbine contained in this module. Such condensate is also applied to tank 50 and mixes with steam condensate from vaporizer 30 and from heat exchanger 45. The amount of steam condensate from the casing of a steam module will usually be insufficient to supply more than two organic fluid modules, while the steam exhausted from the steam module will usually be sufficient to supply two to three organic fluid modules in parallel. Consequently, the organic modules have two configurations: module A shown in FIG. 2 which receives both exhaust steam and steam condensate produced in the steams turbine casing, and module B shown in FIG. 3 which receives only steam condensate.

As shown in FIG. 1, power plant 10 also includes disposal apparatus 55 for disposing of non-condensable gases produced by the organic fluid modules, without releasing significant concentrations of hydrogen sulfide into the atmosphere. The preferred design point pressure in the steam side of organic fluid vaporizer 30, in both modules A and B, is slightly above atmospheric pressure. Consequently, the extraction of the non-condensable gases and steam drawn off into line 36 and supplied to the treatment or abatement plant is also carried out at pressures slightly above atmospheric pressure. This is thus energetically efficient because minimal compressor power is required. At some off-design conditions, a slight vacuum may exist in the steam side of vaporizer 30; but an advantage nevertheless exits in terms of reduced compressor power of compressor 65 for disposing of the non-condensable gases.

In the present embodiment, disposal apparatus 55 includes line 51 for collecting the non-condensable gases from lines 51A of the various modules. Also included in apparatus 55 is cooler 56 for further cooling, and aftercooler 66 for final cooling of said non-condensable gases and the small amount of steam for producing condensate in line 57 and cooled non-condensable gases in line 58. The cooled condensate in line 57 is combined at 59 with the cooled condensate in line 48 collected from lines 48A of the various organic modules, and discarded, preferably by re-injection into a suitable re-injection well (not shown).

Finally, the disposal apparatus includes chemical abatement plant 60 for chemically treating the cooled non-condensable gases supplied through line 58 to remove sulfur in the gases, and producing essentially sulfur-free gases, or gases without a significant amount of hydrogen sulfide or sulfur, which preferably are vented to the atmosphere via stack 61. The chemical abatement plant is conventional, and its exact nature is not a part of the present invention. The preferred chemical abatement plant is one marketed by Wheelabrator Clean Air Systems Inc., of Schaumburg, Ill. under the name "ARI LO-CAT II". Such a plant utilizes process water for make-up purposes, in its operation and produces elemental sulfur which can be disposed of in a safe, conventional manner without harm to the environment.

As shown in FIG. 1, steam condensate in line 63 is preferably used for make-up water for chemical abatement plant 60. In addition, hot steam condensate in line 64 can be used in winter for example to provide necessary heating for chemical abatement plant 60. Such hot steam condensate can be extracted from tank 50 contained in an organic fluid module.

Alternatively, disposal apparatus 55 may include a relatively high stack built for permitting the non-condensable gases to be released at a relatively high altitude. Such release ensures that the concentration of sulfur compounds at substantially ground level is in accordance with the environmentally allowed concentration levels.

The heat that is contained in the geothermal brine separated from the geothermal steam at the well-head, can also be utilized in the production of electricity in the manner shown in FIG. 5 using brine module 70. This module includes vaporizer 71 containing an organic fluid and receiving geothermal brine via line 17 from the separator at the well-head (see FIG. 6) for producing vaporized organic fluid in line 72 and cooled brine in line 73. At least one organic vapor turbine is coupled to a generator. Expansion of the vaporized organic fluid in the organic turbine produces expanded organic fluid and drives the generator which produces electrical power that supplements the power produced by the steam and organic fluid modules described above. Preferably, module 70 includes two organic vapor turbines 74, 75 coupled to a single generator 76 interposed between the two organic vapor turbines.

Here, preferably, turbine 74 receives vaporized organic fluid from line 72 and the expanded exhaust from this turbine is applied to the inlet of turbine 75. The expanded organic fluid exhausted through line 77 is applied to recuperator 78 wherein the superheat in the exhaust is given up to liquid organic fluid in line 79. The desuperheated organic fluid is applied to condenser 80, preferably air-cooled, wherein the desuperheated organic fluid is condensed to liquid organic fluid in line 79. Cycle pump 81 returns the liquid organic fluid to vaporizer 71 via recuperator 78 to complete the organic fluid cycle.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A modular power plant for operating from a source of geothermal fluid that produces geothermal steam containing non-condensable gases including hydrogen sulfide, and geothermal brine, said power plant comprising:

a) at least one steam module having a steam turbine coupled to a generator for expanding said geothermal steam and producing electrical power, low pressure steam, and condensed steam;

b) at least one organic fluid module including a vaporizer containing an organic fluid and receiving low pressure steam from said steam module for producing vaporized organic fluid, steam condensate, and a mixture of steam and non-condensable gases, at least one organic vapor turbine coupled to a generator for expanding said vaporized organic fluid and producing electrical power, and expanded organic fluid, a condenser for condensing said expanded organic fluid to liquid organic fluid, preheater apparatus for preheating said liquid organic fluid using heat contained in both said steam condensate and said mixture, producing cooled steam condensate and non-condensable gases containing a small amount of steam, and a pump for supplying preheated organic fluid to said vaporizer;

c) means for discarding cooled steam condensate;

d) disposal apparatus for disposing of said non-condensable gases without releasing significant concentrations of hydrogen sulfide into the atmosphere.

2. A modular power plant according to claim 1 wherein said disposal apparatus includes:

a) a cooler for cooling said non-condensable gases and said small amount of steam and producing steam condensate and cooled non-condensable gases; and b) a chemical abatement plant for chemically treating said cooled non-condensable gases to remove sulfur therein and producing essentially sulfur-free gases, or gases without significant amounts of sulfur, which are vented to the atmosphere.

3. A modular power plant according to claim 2 wherein said means for discarding includes a steam condensate line for collecting said cooled steam condensate.

4. A modular power plant according to claim 2 wherein the steam side of said vaporizer operates and receives said low pressure steam at pressures slightly above atmospheric pressure and means are provided for supplying said non-condensable gases to the chemical abatement plant at pressure slightly above atmospheric pressure.

5. A modular power plant according to claim 2 including means for collecting condensate from said cooler and supplying the same to said steam condensate line.

6. A modular power plant according to claim 5 wherein said heat exchanger separates steam condensate from said mixture, and said organic fluid module includes means for adding separated condensate to the condensate produced by the vaporizer of said organic fluid module.

7. A modular power plant according to claim 1 wherein said preheater apparatus of said organic fluid module includes a heat exchanger for preheating said liquid organic fluid using heat contained in said mixture.

8. A modular power plant according to claim 1 wherein said preheater apparatus of said organic fluid module includes a heat exchanger for preheating said liquid organic fluid using heat contained in said steam condensate.

9. A modular power plant according to claim 1 wherein said disposal apparatus includes:
   a) a cooler for cooling said non-condensable gases and said small amount of steam and producing steam condensate and cooled non-condensable gases; and
   b) a chemical abatement plant using make-up water for chemically treating said cooled non-condensable gases to remove sulfur therefrom; and
   c) means for supplying said make-up water from said cooled steam condensate.

10. A modular power plant according to claim 1 wherein said organic fluid module includes means for adding said condensed steam to the condensate produced by the vaporizer of said organic fluid module.

11. A modular power plant according to claim 1 including a brine module including a vaporizer containing an organic fluid and receiving geothermal brine from said source of geothermal fluid for producing vaporized organic fluid and cooled brine, at least one organic vapor turbine coupled to a generator for expanding said vaporized organic fluid and producing electrical power, and expanded organic vapor, a condenser for condensing said expanded organic vapor to liquid organic fluid, a recuperator responsive to said expanded organic vapor for preheating said liquid organic fluid using heat contained in said expanded organic vapor, and a pump for supplying preheated organic fluid to said vaporizer.

12. A modular power plant according to claim 1 wherein said steam module includes a by-pass line and a selectively operable by-pass valve in said by-pass line by which a portion of the geothermal steam may selectively by-pass said steam turbine and go directly to the vaporizer of said organic fluid module for improving the start-up characteristics of the power plant.

13. A modular power plant according to claim 1 wherein said at least one organic fluid module includes a second organic vapor turbine coupled to said generator and receiving said vaporized organic fluid in parallel with said at least one organic vapor turbine and producing additional electrical power, and additional expanded organic fluid, means for combining said additional expanded organic fluid with expanded organic fluid produced by said at least one organic vapor turbine and applying the combined expanded organic fluid to said condenser, said generator being interposed between the two organic vapor turbines.

14. An organic fluid power plant module for use with a source of steam comprising:
   a) a vaporizer containing an organic fluid responsive to said steam for producing vaporized organic fluid, steam condensate, and a mixture of steam and noncondensable gases;
   b) a pair of organic vapor turbines coupled to a generator on either side thereof for expanding said vaporized organic fluid and producing electric power;
   c) a condenser for condensing expanded organic fluid to liquid organic fluid; and
   d) preheater apparatus for preheating said liquid organic fluid using heat contained in both said steam condensate and said mixture.

15. An organic fluid power plant module according to claim 14 wherein said preheater apparatus includes a heat exchanger for preheating said liquid organic fluid using heat contained in said mixture, and wherein said heat exchanger separates steam condensate from said mixture, and said module further includes means for adding separated steam condensate to the steam condensate produced by the vaporizer of said organic fluid module.

16. An organic fluid power plant module according to claim 15 wherein said condenser is air-cooled.

17. An organic fluid power plant module according to claim 14 wherein said organic fluid is pentane.

18. A modular power plant for operating from a source of geothermal fluid that produces geothermal steam containing non-condensable gases including hydrogen sulfide, and geothermal brine, said power plant comprising:
   a) at least one steam module having a steam turbine coupled to a generator for expanding said geothermal steam and producing low pressure steam, condensed steam, and electrical power;
   b) a plurality of organic fluid modules each of which includes a vaporizer containing an organic fluid and receiving low pressure steam from said steam module for producing vaporized organic fluid, steam condensate, and a mixture of steam and non-condensable gases, at least one organic vapor turbine coupled to a generator for expanding said vaporized organic fluid and producing electrical power and expanded organic fluid, a condenser for condensing said expanded organic fluid to liquid organic fluid, preheater apparatus for preheating said liquid organic fluid using heat contained in said steam condensate and said mixture, and producing a stream of cooled steam condensate and a stream of non-condensable gases containing a small amount of steam, and a pump for supplying preheated organic fluid to said vaporizer;
   c) a steam condensate line for collecting cooled steam condensate from each of said modules;
   d) a cooler for cooling said stream of non-condensable gases containing a small amount of steam for producing a stream of steam condensate and a stream of cooled non-condensable gases; and
   e) a chemical abatement plant for chemically treating said stream of cooled non-condensable gases to remove sulfur therein and producing essentially sulfur-free gases that are vented to the atmosphere.

19. A method for starting-up a combined cycle power plant that includes at least one steam module having a steam turbine coupled to a generator for expanding geothermal steam supplied to said steam turbine and producing low pressure steam, condensed steam, and electrical power, at least one organic fluid module including a vaporizer containing an organic fluid and receiving low pressure steam from said steam module for producing vaporized organic fluid, steam condensate, and a mixture of steam and non-condensable gases, at least one organic vapor turbine coupled to a generator for expanding said vaporized organic fluid and producing expanded organic fluid and electrical power, a condenser for condensing said expanded organic fluid to liquid organic fluid, preheater apparatus for preheating said liquid organic fluid using heat contained in said steam condensate and producing cooled steam condensate, and a pump for supplying preheated organic fluid to said vaporizer, and a valve system for connecting said geothermal steam directly to said vaporizer and by-passing said steam turbine, said method comprising:

a) closing an inlet valve of said valve system for reducing the supply of geothermal steam to said steam turbine;

b) opening a by-pass valve of said valve system to by-pass said steam turbine and effect application of an amount of geothermal steam directly to said organic fluid module for bringing said organic turbine up to operating conditions and establishing a back pressure on said steam turbine comparable to steady state operating conditions;

c) opening the steam inlet valve of said valve system to allow said geothermal steam to be applied to said steam turbine for accelerating the latter to its synchronization speed;

d) closing said by-pass valve after the operation of said organic turbine; and e) fully opening the steam inlet valve of said valve system to permit the steam turbine to operate at steady state conditions.

20. A method according to claim 19 including the step of using heat contained in said mixture for also preheating said liquid organic fluid and producing cooled non-condensable gases and a small amount of steam.

21. A modular power plant for operating from a source of geothermal fluid that produces geothermal steam containing non-condensable gases including hydrogen sulfide, and geothermal brine, said power plant comprising:

a) at least one steam module having a steam turbine coupled to a generator for expanding said geothermal steam and producing electrical power, and low pressure geothermal steam;

b) at least one organic fluid module including a vaporizer containing an organic fluid and receiving low pressure steam from said steam module at a pressure slightly above atmospheric pressure for producing a stream of vaporized organic fluid, a liquid stream of steam condensate, and a a vapor stream comprising a mixture of steam and non-condensable gases, at least one organic vapor turbine coupled to a generator for expanding said vaporized organic fluid and producing electrical power, and expanded organic fluid, a condenser for condensing said expanded organic fluid to liquid organic fluid, preheater apparatus for preheating said liquid organic fluid using heat contained in said liquid stream of steam condensate and producing cooled steam condensate, and a pump for supplying preheated organic fluid to said vaporizer;

c) means for discarding cooled steam condensate;

d) disposal apparatus for treating said vapor stream and disposing of said non-condensable gases without releasing significant concentrations of hydrogen sulfide into the atmosphere, said disposal apparatus including a chemical abatement plant for chemically treating said non-condensable gases to remove sulfur therein, and producing essentially sulfur free gases, or gases without significant amounts of sulfur, which are vented to the atmosphere; and e) means for supplying said non-condensable gases to said chemical abatement plant at pressures slightly above atmospheric pressure.

22. A modular power plant for operating from a source of geothermal fluid that produces geothermal steam containing non-condensable gases including hydrogen sulfide, and geothermal brine, said power plant comprising:

a) at least one steam module having a steam turbine coupled to a generator for expanding said geothermal steam and producing electrical power, low pressure steam, and condensed steam;

b) at least one organic fluid module including a vaporizer containing an organic fluid and receiving low pressure steam from said steam module at a pressure slightly above atmospheric pressure for producing vaporized organic fluid, steam condensate, and a mixture of steam and non-condensable gases, at least one organic vapor turbine coupled to a generator for expanding said vaporized organic fluid and producing electrical power, and expanded organic fluid, a condenser for condensing said expanded organic fluid to liquid organic fluid, preheater apparatus for preheating said liquid organic fluid using heat contained in said steam condensate and producing cooled steam condensate, and a pump for supplying preheated organic fluid to said vaporizer;

c) means for discarding cooled steam condensate;

d) disposal apparatus for disposing of said non-condensable gases without releasing significant concentrations of hydrogen sulfide into the atmosphere;

e) means for supplying said non-condensable gases to said disposal apparatus at pressures slightly above atmospheric pressure.

23. A modular power plant according to claim 22 wherein said disposal apparatus includes a chemical abatement plant for chemically treating said non-condensable gases to remove sulfur therein, and producing essentially sulfur free gases, or gases without significant amounts of sulfur, which are vented to the atmosphere.

24. An organic fluid power plant module for use with a source of steam containing hydrogen sulfide comprising:

a) a vaporizer containing an organic fluid responsive to said steam for producing a first stream of vaporized organic fluid, and a second stream comprising steam, and non-condensable gases that include hydrogen sulfide;

b) an organic vapor turbine coupled to a generator for expanding said vaporized organic fluid and producing electric power and expanded organic fluid;

c) a condenser for condensing expanded organic fluid to liquid organic fluid;

d) preheater apparatus for preheating said liquid organic fluid using heat contained in said second steam to produce a stream of steam condensate, and a stream of non-condensable gases containing a small amount of steam; and e) disposal apparatus for processing said stream of non-condensable gases containing a small amount of steam to remove hydrogen sulfide thereby producing essentially sulfur-free non-condensable gases, and for venting said sulfur-free non-condensable gases into the atmosphere.

25. An organic fluid power plant module according to claim 24 wherein said disposal apparatus includes:

a) a cooler for cooling said stream of non-condensable gases containing a small amount of steam and producing steam condensate and cooled non-condensable gases; and b) a chemical abatement plant for chemically treating said cooled non-condensable gases to remove sulfur therein and producing essentially sulfur-free non-condensable gases, or non-condensable gases without significant amounts of sulfur, which are vented to the atmosphere.

26. An organic fluid power plant module according to claim 25 wherein said disposal apparatus includes:
   a) a compressor for compressing said cooled non-condensable gases;
   b) an after-cooler for cooling the gases compressed in said compressor before cooled compressed gases are chemically treated.

27. An organic power plant module for use with a source of steam containing hydrogen sulfide comprising:
   a) a vaporizer containing an organic fluid for vaporizing said organic fluid using heat contained in said steam to produce vapor stream containing non-condensable gases, steam and hydrogen sulfide, and a liquid stream containing steam condensate;
   b) an organic vapor turbine coupled to a generator for expanding organic fluid vaporized in said vaporizer and producing electric power and expanded organic fluid;
   c) a condenser for condensing expanded organic fluid to liquid organic fluid;
   d) apparatus including a chemical abatement plant for chemically processing said vapor stream to remove hydrogen sulfide therefrom thereby producing essentially sulfur-free non-condensable gases, and for venting said sulfur-free non-condensable gases into the atmosphere;
   e) means for supplying non-condensable gases to said chemical abatement plant at pressures slightly above atmospheric pressure; and
   f) preheater apparatus for preheating said liquid organic fluid using heat contained in both said liquid stream and said vapor stream.

28. An organic fluid power plant module according to claim 27 wherein said apparatus includes:
   a) a cooler for cooling said vapor stream and producing steam condensate and cooled non-condensable gases; and
   b) a chemical abatement plant for chemically treating said cooled non-condensable gases to remove sulfur therein and producing essentially sulfur-free gases, or gases without significant amounts of sulfur, which are vented to the atmosphere.

29. An organic power plant module according to claim 27 in combination with a steam module having a steam turbine coupled to a generator for producing electricity as geothermal steam is expanded, and for producing expanded geothermal steam which constitutes said source of steam for said organic fluid power plant module.

30. A power plant operating on a source of geothermal fluid that produces geothermal steam containing non-condensable gases, said power plant comprising:
   a) at least one steam module including a steam turbine coupled to a generator for expanding said geothermal steam and producing electrical power and low pressure steam;
   b) means for extracting heat from said low pressure steam for producing steam condensate and a mixture of steam and non-condensable gases;
   c) means for extracting heat from both said steam condensate and said mixture for producing cooled steam condensate and a mixture of cooled steam and non-condensable gases.

31. A power plant according to claim 30 including:
   a) a vaporizer for extracting heat from said low pressure steam and vaporizing a working fluid module for producing vaporized working fluid, said steam condensate and a mixture of steam and non-condensable gases;
   b) at least one working fluid turbine for expanding said vaporized working fluid and producing power and from which expanded working fluid is extracted;
   c) a condenser for condensing said expanded working fluid to produce condensed working fluid; and
   d) preheater means for extracting heat from both said steam condensate and said mixture of steam and non-condensable gases for preheating said condensed working fluid before it is vaporized thereby producing cooled steam condensate and a mixture of cooled steam and non-condensable gases.

32. A power plant according to claim 31 wherein said working fluid is an organic fluid.

33. A method for operating a power plant on a source of geothermal fluid that produces geothermal steam containing non-condensable gases including hydrogen sulfide, said method comprising the steps of:
   a) expanding said geothermal steam and producing electrical power and low pressure steam;
   b) extracting heat from said low pressure steam for producing steam condensate and a mixture of steam and non-condensable gases;
   c) extracting heat from both said steam condensate and said mixture for producing cooled steam condensate and a mixture of cooled steam and non-condensable gases.

34. A method according to claim 33 including:
   a) extracting heat from said low pressure steam by vaporizing a working fluid thereby producing said steam condensate and a mixture of steam and non-condensable gases;
   b) producing power from the heat extracted in step a) by expanding the vaporized working fluid and producing expanded working fluid;
   c) condensing said expanded working fluid to produce condensed working fluid; and
   d) extracting heat from both said steam condensate and said mixture of steam and non-condensable gases by preheating said condensed working fluid before it is vaporized thereby producing said cooled steam condensate and said mixture of cooled steam and non-condensable gases.

35. A method according to claim 34 wherein said working fluid is an organic fluid.

36. A method according to claim 34 including the steps of:
   a) further cooling said mixture of cooled steam and non-condensable gases for condensing the cooled steam and effecting separation of said non-condensable gases;
   b) disposing of separated non-condensable gases without releasing significant amounts of hydrogen sulfide to the atmosphere.

* * * * *